US008880620B2

(12) United States Patent
de Souza et al.

(10) Patent No.: US 8,880,620 B2
(45) Date of Patent: Nov. 4, 2014

(54) SOCIAL GRAPHING FOR DATA HANDLING AND DELIVERY

(75) Inventors: Jeremy de Souza, Redmond, WA (US); Charlie R. Chung, Tacoma, WA (US); Wilbert De Graaf, Bellevue, WA (US); Shubhankar Sanyal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 12/483,246

(22) Filed: Jun. 12, 2009

(65) Prior Publication Data

US 2010/0318613 A1 Dec. 16, 2010

(51) Int. Cl.
*G06F 15/16* (2006.01)
*G06Q 10/10* (2012.01)

(52) U.S. Cl.
CPC .................................. *G06Q 10/107* (2013.01)
USPC ......................................... 709/206; 709/200

(58) Field of Classification Search
USPC ................................................. 709/200, 206
See application file for complete search history.

(56) References Cited

U.S. PATENT DOCUMENTS

| | | | | |
|---|---|---|---|---|
| 6,546,417 B1 * | 4/2003 | Baker | ............................ | 709/206 |
| 6,832,245 B1 * | 12/2004 | Isaacs et al. | ................... | 709/206 |
| 6,993,564 B2 * | 1/2006 | Whitten, II | .................... | 709/207 |
| 7,167,910 B2 * | 1/2007 | Farnham et al. | .............. | 709/223 |
| 7,673,003 B2 * | 3/2010 | Little, II | ......................... | 709/206 |
| 7,716,287 B2 * | 5/2010 | Appelman et al. | ............ | 709/205 |
| 7,761,549 B2 * | 7/2010 | Farnham et al. | .............. | 709/223 |
| 7,797,318 B2 * | 9/2010 | Torres et al. | ................... | 707/736 |
| 7,831,684 B1 * | 11/2010 | Lawler et al. | .................. | 709/217 |
| 7,844,671 B1 * | 11/2010 | Lawler et al. | .................. | 709/206 |
| 7,885,901 B2 * | 2/2011 | Hull et al. | ...................... | 705/319 |
| 7,921,163 B1 * | 4/2011 | Odell et al. | .................... | 709/206 |
| 7,945,653 B2 * | 5/2011 | Zuckerberg et al. | ........... | 709/223 |
| 8,010,619 B1 * | 8/2011 | Lawler et al. | .................. | 709/217 |

(Continued)

FOREIGN PATENT DOCUMENTS

EP 1990973 A2 11/2008

OTHER PUBLICATIONS

Hansell, Saul, "Inbox 2.0: Yahoo and Google to Turn e-Mail into a Social Network", Retrieved at <<http://bits.blogs.nytimes.com/2007/11/13/inbox-20-yahoo-and-google-to-turn-e-mail-into-a-social-network/>>, Nov. 13, 2007.

(Continued)

*Primary Examiner* — Anthony Mejia
(74) *Attorney, Agent, or Firm* — Louise Bowman; Brian Haslam; Micky Minhas

(57) ABSTRACT

Architecture that enables data handling according to types of social relationships. A social graph is used to categorize the types of the social relationships of the tagged messaging users. The social graph can include social relationship categories for friends, family, coworkers, and blocked individuals of the recipient, for example. The social graph can also include metadata related to the tagged users. The metadata defines the social relationship of the tagged users to the recipient. Delivery of messages to the recipient from the tagged messaging users is managed based on the social graph. Delivery management can include blocking messages, allowing the messages through, or delivering the messages with high or low priority, for example. Email messages can be delivered to respective email locations based on the social graph. User information can be imported and/or mined from external sources to augment the social graph.

16 Claims, 13 Drawing Sheets

(56) References Cited

U.S. PATENT DOCUMENTS

| | | | |
|---|---|---|---|
| 8,065,369 B2* | 11/2011 | Turski et al. | 709/206 |
| 8,078,682 B1* | 12/2011 | Worley et al. | 709/206 |
| 8,082,308 B1* | 12/2011 | Filev | 709/206 |
| 8,239,874 B2* | 8/2012 | Anderson et al. | 719/314 |
| 8,358,579 B1* | 1/2013 | Walsh et al. | 370/230 |
| 2005/0246420 A1 | 11/2005 | Little, II | |
| 2006/0048059 A1 | 3/2006 | Etkin | |
| 2006/0173963 A1* | 8/2006 | Roseway et al. | 709/206 |
| 2007/0161382 A1* | 7/2007 | Melinger et al. | 455/456.1 |
| 2007/0168430 A1* | 7/2007 | Brun et al. | 709/206 |
| 2007/0250566 A1* | 10/2007 | Appelman et al. | 709/204 |
| 2008/0004080 A1* | 1/2008 | Li et al. | 455/564 |
| 2008/0040126 A1* | 2/2008 | Estrada et al. | 705/1 |
| 2008/0147818 A1* | 6/2008 | Sabo | 709/206 |
| 2008/0270615 A1* | 10/2008 | Centola et al. | 709/228 |
| 2009/0089798 A1* | 4/2009 | Anderson et al. | 719/314 |
| 2009/0099895 A1* | 4/2009 | Carrier et al. | 705/9 |
| 2009/0125597 A1* | 5/2009 | Carr et al. | 709/206 |
| 2009/0177744 A1* | 7/2009 | Marlow et al. | 709/204 |
| 2009/0187983 A1* | 7/2009 | Zerfos et al. | 726/10 |
| 2009/0265431 A1* | 10/2009 | Jania et al. | 709/206 |
| 2009/0282100 A1* | 11/2009 | Kim et al. | 709/203 |
| 2009/0282367 A1* | 11/2009 | Canis | 715/828 |
| 2009/0327054 A1* | 12/2009 | Yao et al. | 705/12 |
| 2010/0023584 A1* | 1/2010 | Kamdar et al. | 709/206 |
| 2010/0030859 A1* | 2/2010 | Huang | 709/206 |
| 2010/0057858 A1* | 3/2010 | Shen et al. | 709/206 |
| 2010/0081461 A1* | 4/2010 | Bothra et al. | 455/466 |
| 2010/0082751 A1* | 4/2010 | Meijer et al. | 709/206 |
| 2010/0088378 A1* | 4/2010 | Asawa et al. | 709/206 |
| 2010/0153215 A1* | 6/2010 | Abraham | 705/14.55 |
| 2010/0153284 A1* | 6/2010 | Hoag et al. | 705/319 |
| 2010/0161537 A1* | 6/2010 | Liu et al. | 706/46 |
| 2010/0191836 A1* | 7/2010 | Knight | 709/220 |
| 2010/0228476 A1* | 9/2010 | Bar-Zeev et al. | 701/209 |
| 2010/0228812 A1* | 9/2010 | Uomini | 709/203 |
| 2010/0268830 A1* | 10/2010 | McKee et al. | 709/228 |
| 2010/0306307 A1* | 12/2010 | Baessler et al. | 709/203 |
| 2010/0306762 A1* | 12/2010 | Lindberg et al. | 717/176 |
| 2010/0318544 A1* | 12/2010 | Nicolov | 707/759 |
| 2011/0289574 A1* | 11/2011 | Hull et al. | 726/7 |
| 2012/0001919 A1* | 1/2012 | Lumer | 345/440 |
| 2012/0079040 A1* | 3/2012 | Odell et al. | 709/206 |
| 2012/0099486 A1* | 4/2012 | Langos et al. | 370/259 |

OTHER PUBLICATIONS

Tungare, et al., "You Scratch My Back and I'll Scratch Yours: Combating Email Overload Collaboratively", Retrieved at <<http://manas.tungare.name/publications/tungare_2009_you-scratch.pdf>>, CHI 2009, Apr. 4-9, 2009.

"Social Email Graph (SEG) Yahoo's Low Hanging Fruit", Retrieved at <<http://coolastory.blogspot.com/2007/10/social-email-graph-seg-yahoolow-hanging.html>>, Oct. 22, 2007.

"Strato Adds Patent-Pending Spam Filter with Social Graph Analysis", Retrieved at <<http://www.cbronline.com/news/strato_adds_patent_pending_spam_filter_with_social_graph_analysis>>, Oct. 12, 2006.

* cited by examiner

SOCIAL GRAPHING FOR DATA HANDLING AND DELIVERY

BACKGROUND

Messaging technologies such as email enable users to remotely communicate and send data and documents to other users. In an enterprise communications network, recipients typically receive email messages from different senders. High priority email messages can be received from supervisors, team collaborators, and administrative assistants, in connection with matters such as pending projects, deadlines, and reminders, for example.

Other messages can be work or office related, but of lower priority, such as messages of non-urgent matters, notices of social events, and miscellaneous items of general interest to coworkers. Still other messages can be non-work-related and can originate from friends inside or outside the enterprise. Still other messages can be undesirable such as "junk email" or "spam."

Typically, email messages of the aforementioned types are received from a predominantly known set of senders and from known sources. In an enterprise, the quantity of email delivered to a mailbox of a recipient can reach a volume where it becomes a nuisance for the recipient to repeatedly determine which emails are relevant or important and which are not. Email filters can provide some relief in blocking messages; however, such filters are typically used to block senders outside a network, and are less efficient within an enterprise since users may want or need access to other users.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture utilizes social graphing to manage the filtering and delivery of data, such as messages and email. The user can manage the data according to the types of social relationships. The social relationships of the senders to the recipient can be used as inputs to control deliverability, organize the data (e.g., email), and add metadata that can be used by other data processes to trigger an action.

The social relationships are associated with the senders (e.g., supervisor, co-worker, family, spam sources, etc.) by tagging the sender. Senders are tagged based on the type of social relationship to the recipient (entity that receives the data from the sender) and data flow restrictions or other actions associated with the type and weight of the social relationship. This social relationship framework can be controlled by the recipient or can be delegated to another user for control. The social relationships can be defined locally within an enterprise network and/or can be referenced to an external social network provider. The framework can rely on manual tagging of senders by the recipient and/or can be automated based on sources of relationship data such as online social networks and communities, for example.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
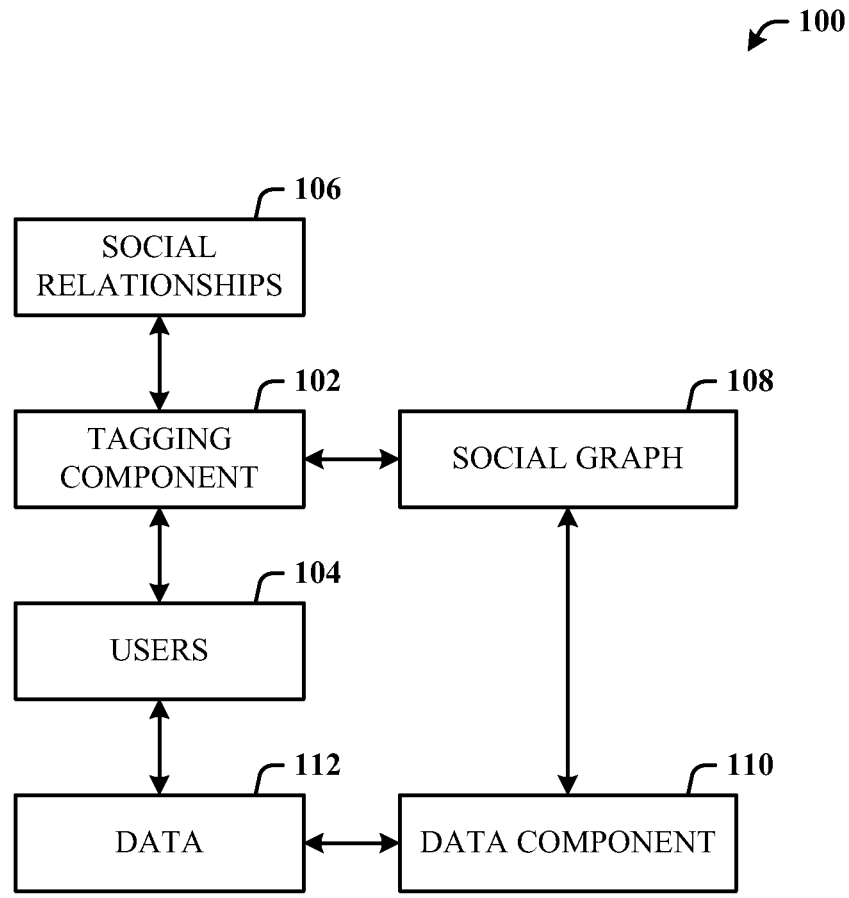
FIG. 1 illustrates a computer-implemented data delivery system in accordance with the disclosed architecture.

The disclosed architecture enables data handling based on the tagging of data senders by recipients according to types of social relationships. A social graph is used to categorize the types of the social relationships of the tagged users. The social graph can include social relationship categories for friends, family, coworkers, and blocked individuals of the recipient, for example. The social graph can also include metadata related to the tagged users. The metadata defines the social relationship of the tagged users to the recipient.

In the context of data such as messages (e.g., email), the delivery of messages to the recipient from the tagged messaging users is managed based on the social graph. The delivery management can include blocking unwanted messages, allowing wanted messages through, and/or handling and delivering messages with designated priority levels, for example. For example, email messages can be delivered to respective email locations based on the social graph. Additional management capabilities can be performed based on the social graph, such as importing and mining user information from external sources to augment the social graph.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented data delivery system 100 in accordance with the disclosed architecture. A tagging component 102 is provided for tagging users 104 (e.g., manually by a recipient and/or automatically) according to the type of social relationships 106 as defined by a social graph 108. The social graph 108 can define general categories of the social relationships 106, as described in greater detail hereinbelow. The categories of social relationships 106 are not exclusive, and the sender can be in more than one category of the social relationships 106.

As illustrated in FIG. 1, a data component 110 handles data 112 of the tagged users 104 (e.g., senders) based on the social graph 108. The data component 110 can perform actions on the data 112, such as transmitting data to a specific destination, as will also described in greater detail hereinbelow. The actions performed can also include storing the data 112, handling the data 112, and/or processing the data 112 in accordance with the tagging of users 104 based on the social graph 108.

The system 100 organizes the data 112 and enables the recipient of the data 112 to view the data 112 (e.g., email) based on the associated social graph 108. The recipient with established social relationships to tagged users 104 can provide email communications in an organized manner compared to messages outside the associated social graph 108. The social relationship of the users 104 relative to the recipient can be manually and/or automatically stamped (tagged) on the data 112 during incoming delivery (receipt), for example. The social relationship can be viewed by any client that retrieves the message. The client can determine how to represent the social relationship.

The information of the social graph 108 can be made available to an entire email system so that other processes can utilize this information and apply customized actions based on the social relationships 106 of the senders to the recipient. In this way, the information of the social graph 108 can operate as a common infrastructure that can be accessed and referenced by other subsystems that can utilize the information to take new actions.

Figure 2:
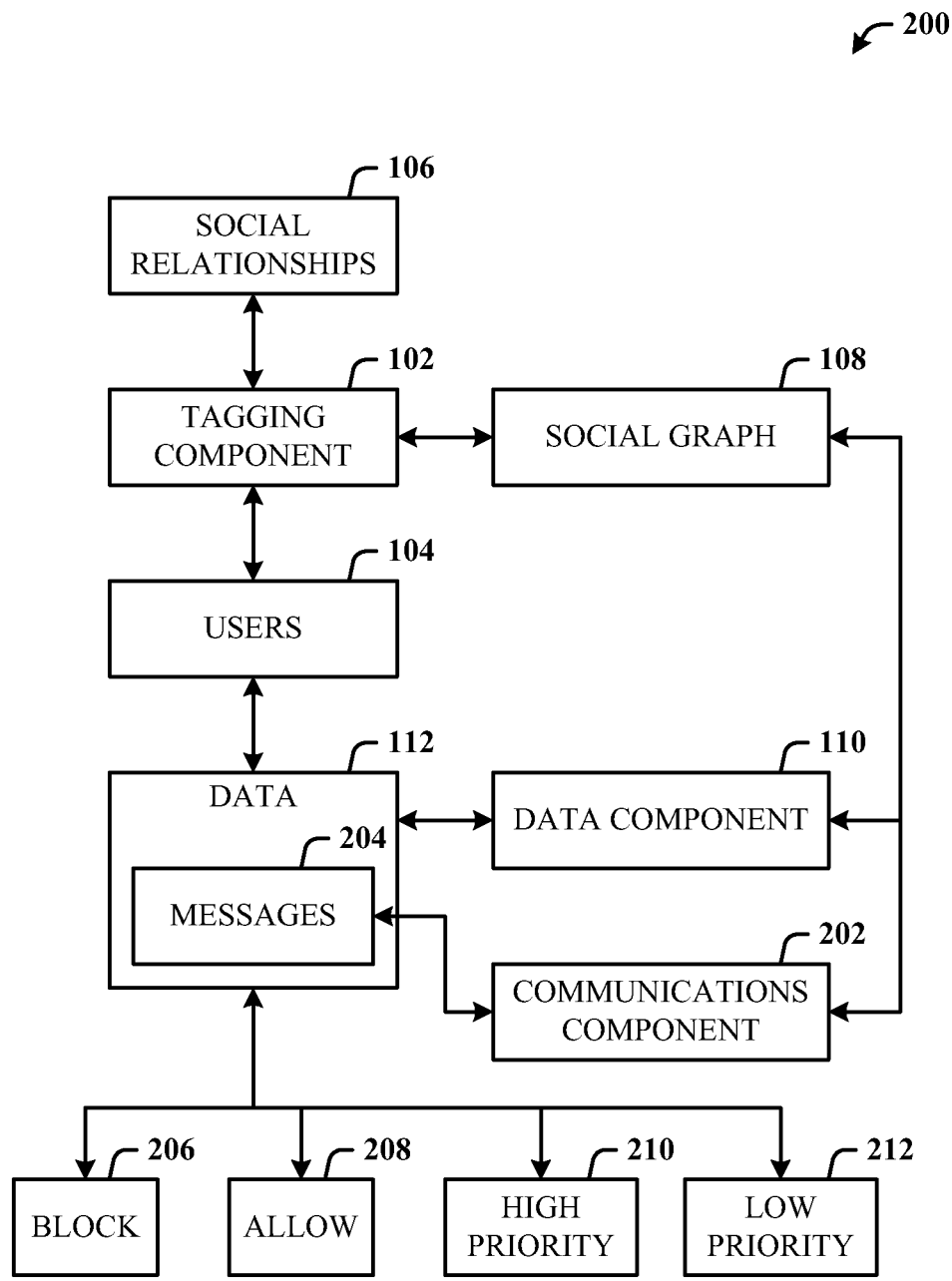
FIG. 2 illustrates an alternative embodiment of a data delivery system that includes additional entities for transmitting data.

FIG. 2 illustrates an alternative embodiment of a data delivery system 200 that includes additional entities for transmitting data. A communications component 202 is provided for transmitting the data 112, which can include messages 204, to the recipient based on the social graph 108. The messages 204 can be email messages and the users 104 can be email senders. Alternatively, the messages 204 can be text messages from instant messaging users, for example. Additionally, the system 200 enables message delivery to be prioritized according to the social graph 108 of the associated recipient.

As illustrated in FIG. 2, the messages 204 can be text messages, documents exchanged over a network, or network-based voice messages, for example. The actions performed on the messages 204 can include applying a block 206 on the messages 204, applying an allow 208 on the messages 204, and/or delivering the messages according to priority levels such as a high priority 210 or low priority 212. When applying the block 206, corresponding messages 204 are denied deliverability, and can be optionally routed to a "spam folder" for viewing by the recipient and deletion. When applying allow 208, corresponding messages 204 can be delivered in the usual way. When dealing with priorities (e.g., high priority 210 and low priority 212), the corresponding messages 204 can routed to suitable folders and/or flagged for the recipient. In this way, the system 200 provides the ability to filter, reject, or allow delivery of email to the recipient based on the social graph 108.

Figure 3:
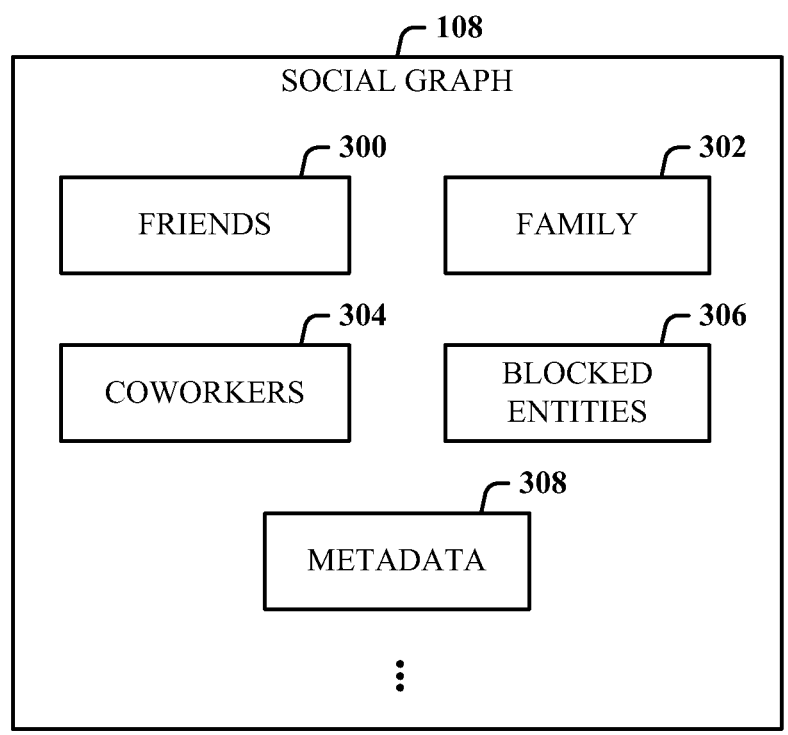
FIG. 3 illustrates types of social relationships and other information used with the social graph.

FIG. 3 illustrates types of social relationships and other information used with the social graph 108. The social graph 108 can include social relationship categories of friends 300, family 302, coworkers 304, and blocked entities 306, for example, of the recipient. In this way, the recipient can sort, select, and filter data (e.g., email) based on the social relationships 106 of respective senders. The social graph 108 can also include metadata 308 related to the tagged users 104. The metadata 308 defines the social relationship to the recipient. The metadata 308 can include information such as email contact profile entries, and information from online social networking applications, for example. The metadata 308 can include physical and virtual addresses that identify a social relationship, such as common residency or common involvement in an enterprise, for example.

Figure 4:
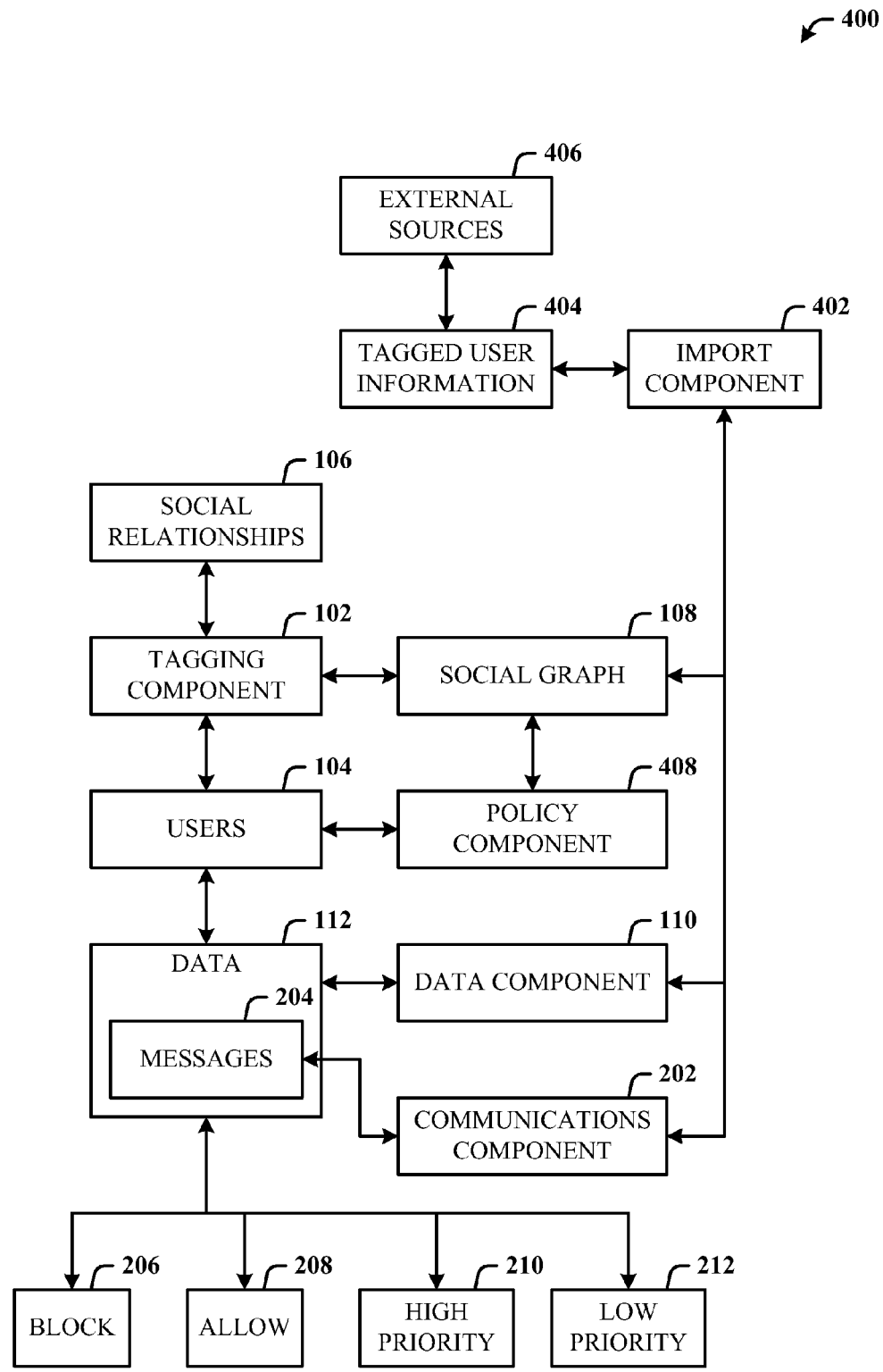
FIG. 4 illustrates an alternative embodiment of a data delivery system that includes additional entities for importing information and applying generic actions.

FIG. 4 illustrates an alternative embodiment of a data delivery system 400 that includes additional entities for importing information and applying generic actions. An import component 402 is provided for importing tagged user information 404 from external sources 406 to augment the social graph 108. The external sources 406 can include contact stores from third party messaging providers on the Internet such as web-based email applications and/or social networking application websites, for example.

As illustrated in FIG. 4, the external sources 406 can be imported into the social graph 108 of the recipient by the import component 402, which can include a contact aggregation provider that logs into each provider using a delegated authentication code or password authorization. The import component 402 can send the contact information to the social graph 108 as metadata 308 (of FIG. 3) associated with the users in the contact stores. The imported contact information can reside on the social graph 108 with a tag assigned by default and/or defined by the recipient.

The system 400 can further include a policy component 408 for applying a generic action to tagged users 104 based on the social graph 108. The generic action can be a data handling operation distinct from the message handling actions described hereinabove. The generic actions applied by the policy component 408 can include applying a category stamp or a security access level, for example. The policy component 408 can construct any arbitrary policy upon which a generic action can be taken based on social graph 108.

Figure 5:
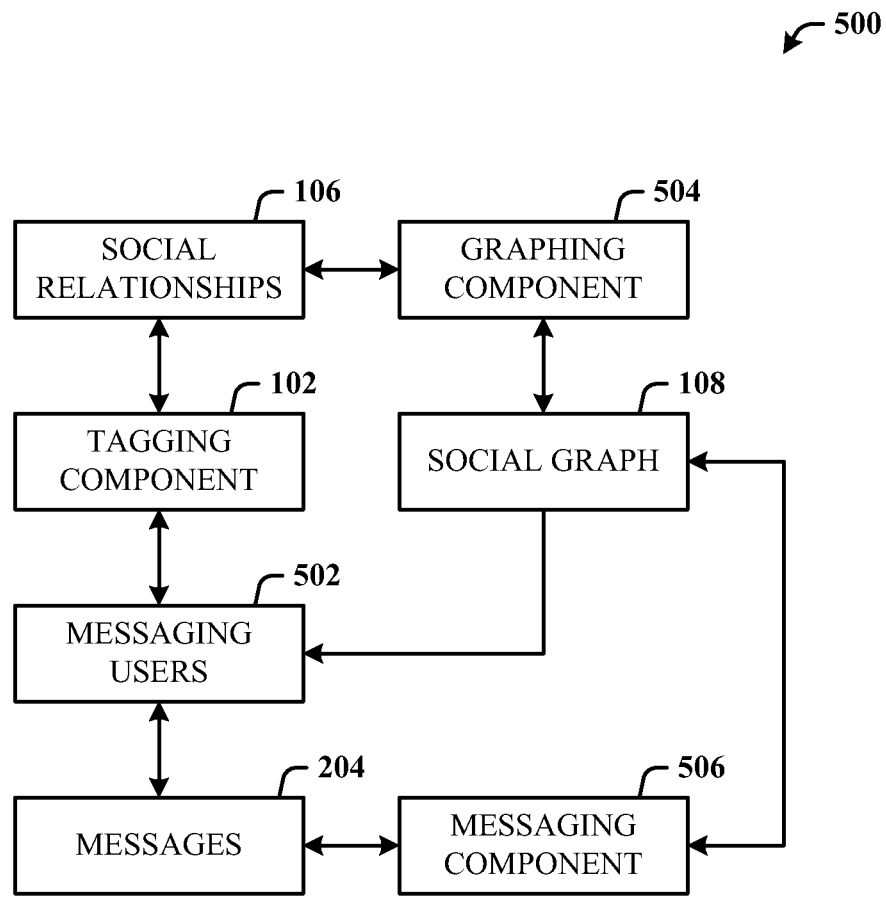
FIG. 5 illustrates an alternative embodiment of the data delivery system.

FIG. 5 illustrates an alternative embodiment of a data delivery system 500. The tagging component 102 is provided for tagging messaging users 502 according to types of social relationships 106. A graphing component 504 is provided for building the social graph 108 based on categorization of the types of the social relationships 106 of the tagged messaging users 502. A messaging component 506 is provided for managing delivery of the messages 204 to a recipient from the tagged messaging users 502 based on the social graph 108.

As described herein, the tagging component 102 can include a user interface operable by the recipient and/or by a network administrator to add sender contacts to a list. The categories of the social relationships 106 can include blocked senders, resulting in a list of senders from which the recipient cannot receive email. Senders added to the blocked category are defined as tagged messaging users 502 that are blocked from sending email to the recipient. Senders added to the social graph 108 are tagged according to a respective category. Tagging can be done at the server level or at the client level.

Figure 6:
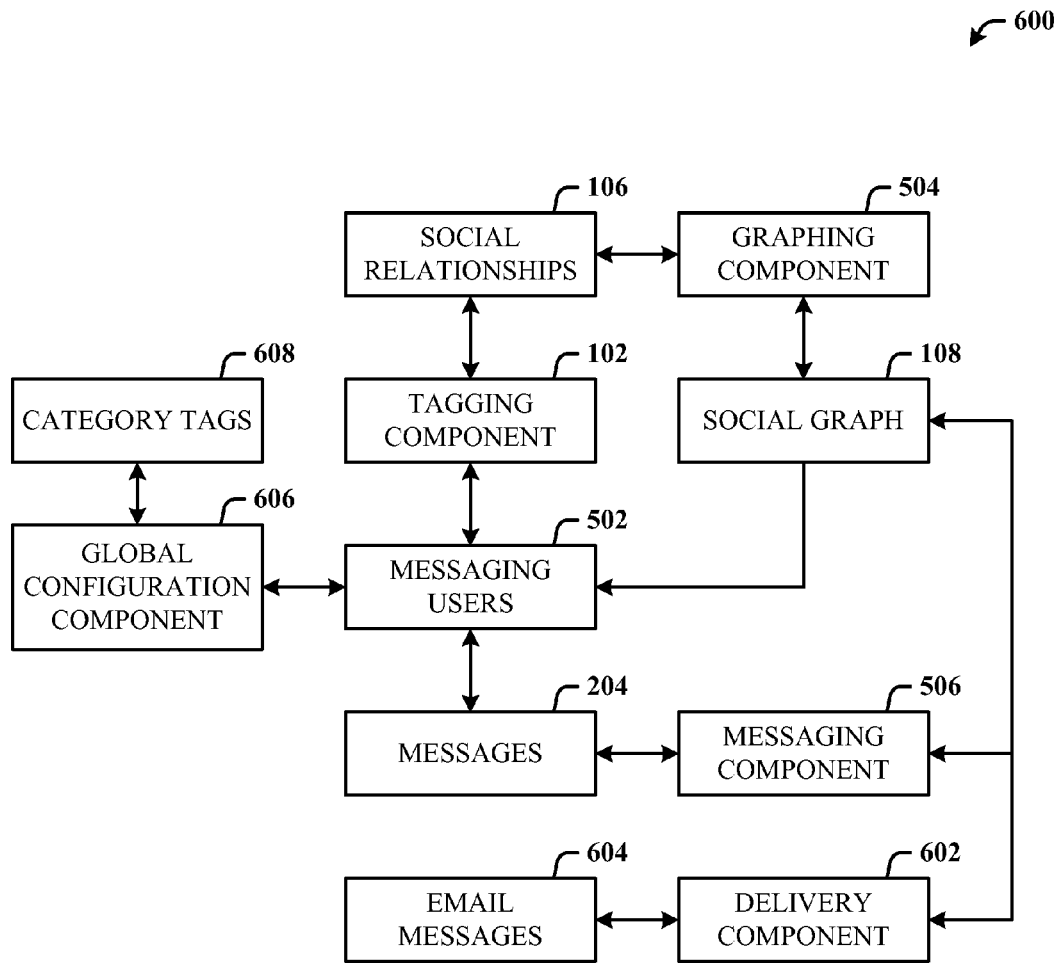
FIG. 6 illustrates an alternative embodiment of a data delivery system that includes additional entities for delivery and configuration.

FIG. 6 illustrates an alternative embodiment of a data delivery system 600 that includes additional entities for delivery and configuration. A delivery component 602 is provided for delivering email messages 604 to respective email locations based on the social graph 108. The delivery component 602 can deliver email messages 604 to a recipient or block an unwanted message. The email locations can include email folders associated with each category of the social relationships 106, for example. For blocked messages, the email locations can include a spam folder or the like. The delivery component 602 can also prioritize the email messages 604 so that the email messages 604 take an optimal route to an inbox of the recipient. The delivery component 602 can redirect mail through non-default routes to the recipient's mailbox for additional processing of the message.

The delivery component 602 can include a software process in an email server that can examine the senders of the email messages 604 and perform one or more actions based on the tagging assigned to the sender in the recipient's social graph. The actions can respectively block the message, allow the messages through, or deliver the message according to priority information.

By tagging messaging users 502 based on the social graph 108, messages are delivered by the delivery component 602 only from tagged senders. This is different from typical content-based spam filtering that prevents spam from being delivered to the inbox of a recipient. In an example, the social graph 108 of a User 1 is configured to receive email from senders who are tagged "friends," "coworkers," and/or "family." This can be implemented with a software agent running in a transport pipeline that inspects senders of the messages 204 and ensures that each sender is tagged in the social graph 108 of the recipient. Otherwise, the messages 204 are blocked.

As also illustrated in FIG. 6, a global configuration component 606 is provided for maintaining a list of social relationship category tags 608 for tagging the messaging users 502. The category tags 608 can be expanded to include new categories, as specified by the recipient or delegate. A list of the messaging users 502 and associated social relationships 106 to the recipient can be stored in a recipient object. The social relationships 106 between the recipient and certain groups can also be stored in a recipient object. In terms of semantics, an administrator can define a number of categories of the social relationships 106. Tagged messaging users 502 in a particular category are not mutually exclusive and can be tagged according to multiple social relationships 106 on the social graph 108.

The global configuration component 606 can associate one or more of the category tags 608 with each of the messaging users 502 on the list. Each entry on the list can store a link to each of the messaging users 502 and a string specifying the relationship. For example, for a recipient user1@nowhere-domain.com, a list of tagged messaging users 502 can include the following:

| User | Relationship |
|---|---|
| user2@nowhere-domain.com | "coworker" |
| user3@nowhere-domain.com | "friend" |
| user3@nowhere-domain.com | "family" |
| spammer@spam.com | "blocked' |

Figure 7:
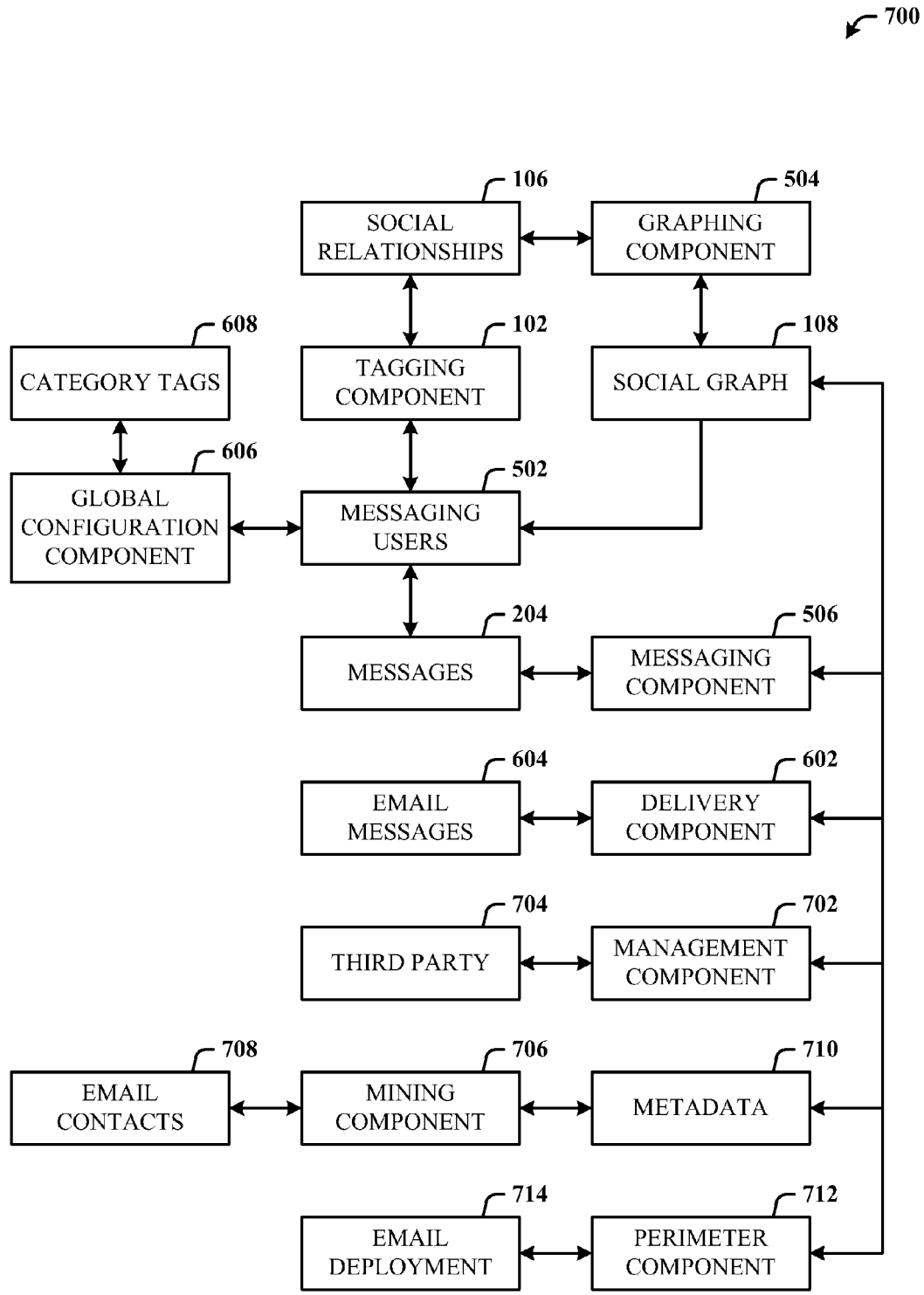
FIG. 7 illustrates an alternative embodiment of a data delivery system that includes additional entities for managing and augmenting the social graph and controlling delivery.

FIG. 7 illustrates an alternative embodiment of a data delivery system 700 that includes additional entities for managing and augmenting the social graph 108 and controlling delivery. A management component 702 is provided for enabling a third party 704 to manage the social graph 108. The third party 704 can tag the messaging users 502 with one of the types of social relationships 106 on behalf of the recipient. In an enterprise network, the third party 704 can be a network administrator or an administrative assistant, for example, to which management is delegated. In a home email application, the third party 704 can be a parent, for example.

As illustrated in FIG. 7, a mining component 706 is provided for automatically mining email contacts 708 to identify metadata 710 to augment the social graph 108. The email contacts 708 can be senders that exchange email with recipient. The mining component 706 can be an automated procedure for identifying different stores of data and information about the social relationships 106 of the messaging users 502 and storing the user information via a tag.

The mining component 706 can mine stored email in folders on the email application of the recipient. The mining component 706 can also mine an instant messaging history or documents of the senders, for example. The mining component 706 can also mine relevant websites, including online services and social networking websites, for example. The mining component 706 can also mine locations and addresses of stores provided by the recipient, or can perform this function automatically, to mine information centered closely related to the recipient and the messaging users 502.

As illustrated in FIG. 7, a perimeter component 712 is provided for accessing the social graph 108 and controlling delivery of email messages at a perimeter (e.g., edge servers) of an email deployment 714. In this way, the perimeter component 712 can access the social graph 108 from the perimeter of the email deployment 714 and thereby control delivery without allowing email messages to actually enter the email deployment 714. In this manner, the social graph 108 of the recipient can be synchronized to perimeter email servers such that messages from unwanted senders can be rejected directly. Thus, unwanted email traffic is blocked from passing to internal mail servers.

The perimeter component 712 can be implemented on an edge server, which functions at the interface of the outside networks and internal enterprise nodes. Messages deemed acceptable can then be passed from the edge server (or perimeter server) to internal message servers for further routing. The perimeter component 712 enables the edge server to access the social graph 108 to make a determination at the perimeter of the enterprise, rather than sending messages internally for determination. In this way, unwanted emails, such as those containing viruses or other undesirable code, can be blocked at the point of entry to an enterprise.

Figure 8:
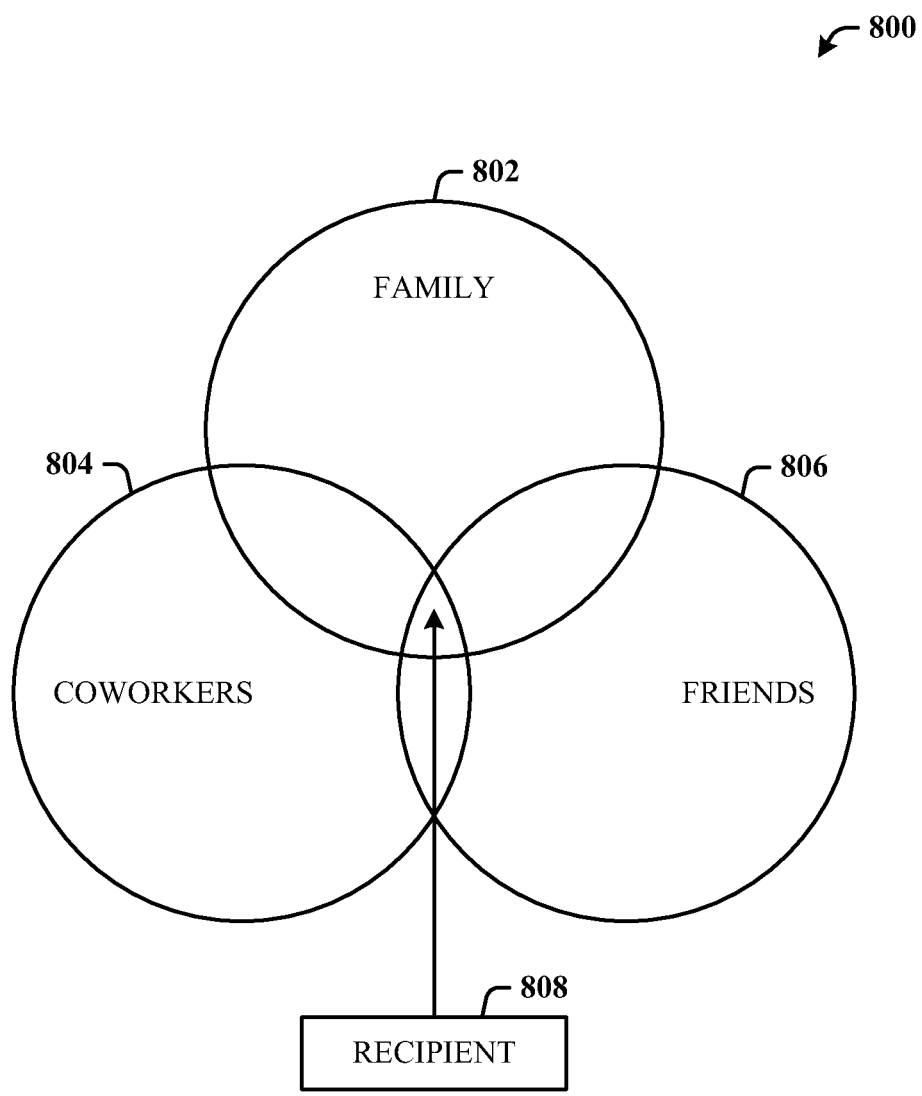
FIG. 8 illustrates an implementation of a social graph.

FIG. 8 illustrates an example of a social graph 800. Categories of social relationships are defined on the social graph 800 for senders, including categories associated with actions such as family 802, coworkers 804, and friends 806. As illustrated, the social graph 800 can be a depicted as a Venn diagram in which categories can overlap, so that senders can be in more than one category. The social graph 800 is centered around a recipient 808. The recipient 808 can be regarded as occupying the intersecting region at the center of the social graph 800. During operations such as mining, graphing, or tagging, as described hereinabove, information obtained is incorporated in such a way as to maintain the recipient 808 at the intersecting region of the social graph 800.

Figure 9:
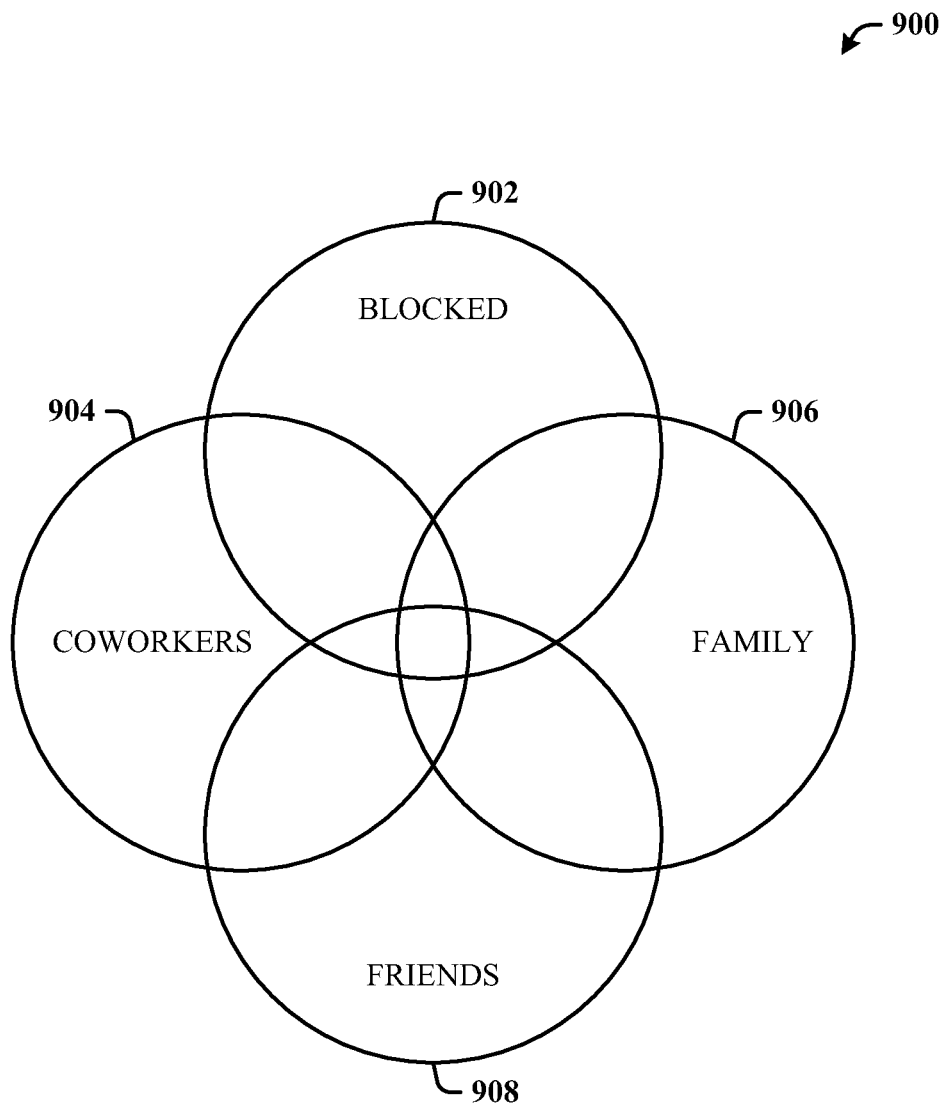
FIG. 9 illustrates an alternative implementation of a social graph.

FIG. 9 illustrates an alternative implementation of a social graph 900. Social relationships defined on the social graph 900 can be categorized as blocked 902, coworkers 904, family 906, and friends 908, for example. The social graph 900 can include an unlimited variety of categories and need not be limited to a two-dimensional depiction as shown in FIGS. 8 and 9.

The social graph 900 can be an explicit description of social relationships of senders to a recipient within a circle of communication. The social graph 900 enables information to be brought into an environment of the recipient to be used for email scenarios, for example, as well a general data handling. Sender information can be initially added to the social graph 900 through a bulk import of user contact information. Alternatively, a sender not originally in a contact store of a recipient can be manually entered by tagging the sender.

The ability to tag senders into categories of a social graph enables a recipient to build a hierarchy for the purpose of routing messages. And conditional routing based on hierarchy of social categories is more efficient than conditional routing based on a location and/or identity of a sender. A recipient can organize email according to family members or coworkers or personal business partners and apply differential behavior to the manner of routing email from senders to recipients, thereby providing a level of leveraging on handling the information.

As described herein, tagging can be performed automatically and/or manually. A corporate enterprise can implement a selectively granular tagging algorithm for distinguishing types of internal and external messages. Generally, email arriving externally from the Internet or otherwise outside of the network can be tagged as "foreign" or "external," for example. Email originating inside the corporate enterprise can be tagged as "important" or "inter-company", for example. In another aspect, senders already in an address book of a recipient can be tagged a certain way, such as senders originating from a certain email provider, for example. Other examples of automatic tagging implementations can also be contemplated.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 10:
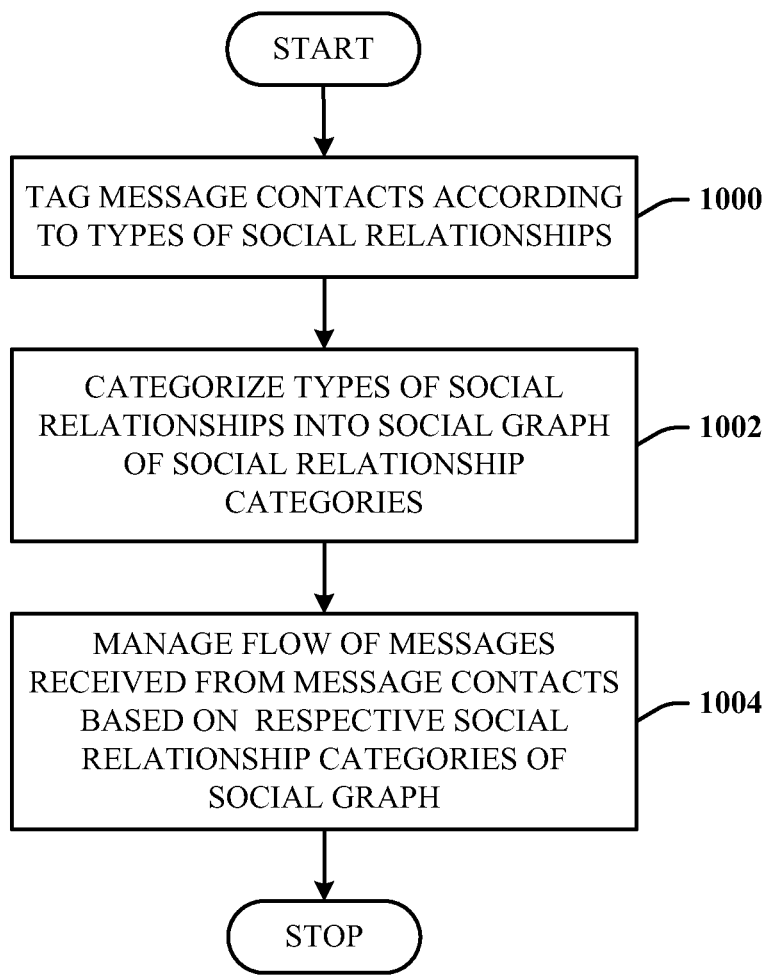
FIG. 10 illustrates a method of managing message delivery based on a social graph.

FIG. 10 illustrates a method of managing message delivery based on a social graph. At 1000, message contacts are tagged according to types of social relationships. As described hereinabove, these social relationships can include friends, family, coworkers, or blocked senders, for example. At 1002, the types of the social relationships are categorized into a social graph of social relationship categories. As described hereinabove, the social graph can include any number of social relationship categories. At 1004, the flow of the messages received from the message contacts is managed based on respective social relationship categories of the social graph.

Figure 11:
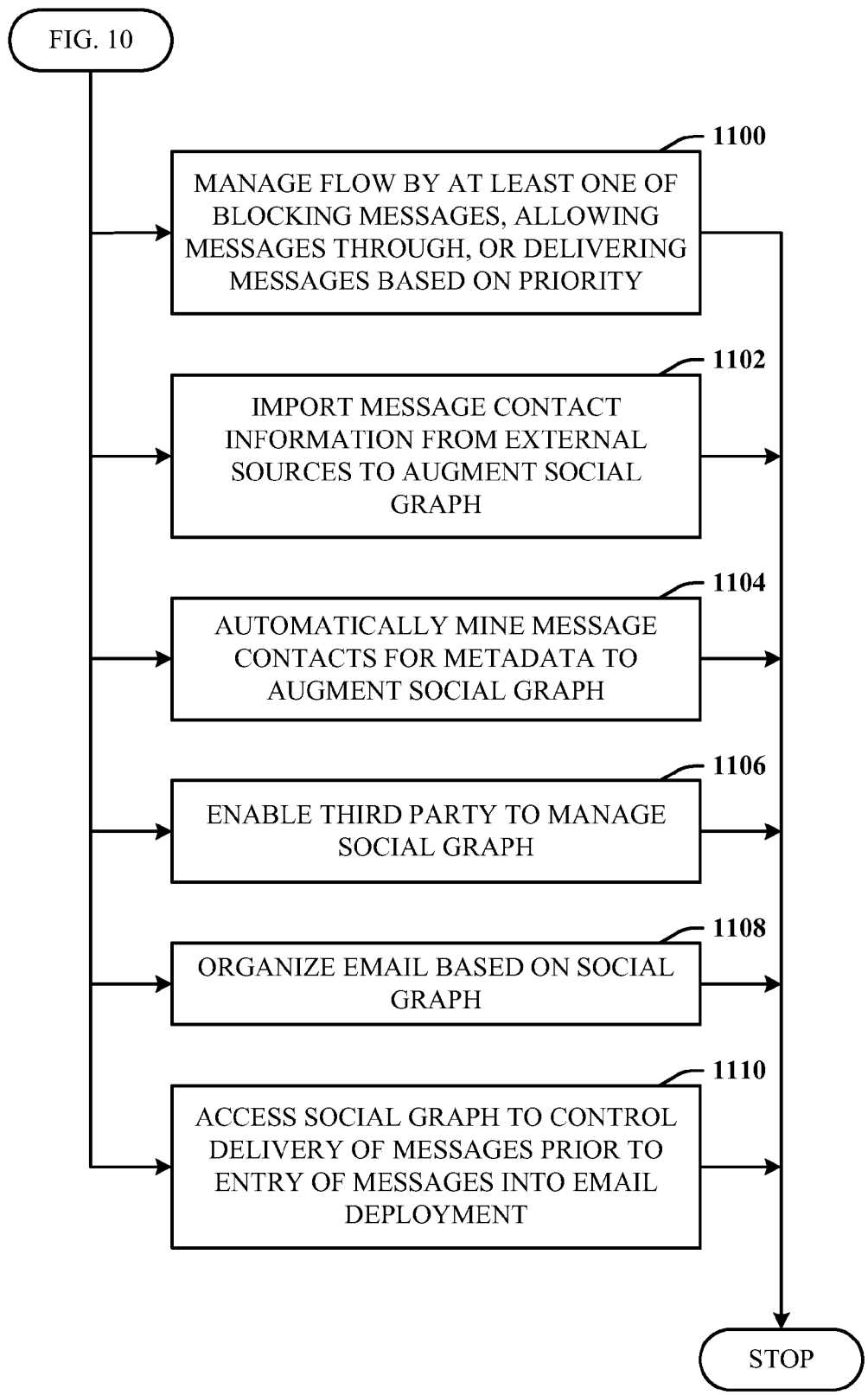
FIG. 11 illustrates additional aspects of the method of managing message delivery based on a social graph.

FIG. 11 illustrates additional aspects of the method of FIG. 10 of managing message delivery based on a social graph. At 1100, flow is managed by at least one of blocking the messages, allowing the messages through, or delivering the messages based on priority. As described hereinabove, the priority can be high priority or low priority, for example. At 1102, message contact information is imported from external sources to augment the social graph. The external sources can be online services and web-based social networking applications, for example.

As illustrated in FIG. 11, at 1104, the message contacts are automatically mined for metadata to augment the social graph. At 1106, a third party is enabled to manage the social graph. As described hereinabove, the third party can be a network administrator, administrative assistant, parent, or any person delegated to perform management, for example. At 1108, email is organized based on the social graph. The organization can include routing email to specific folders according to respective categories of social relationships, for example. At 1110, the social graph is accessed to control delivery of the messages prior to entry of the messages into an email deployment. As described hereinabove, the delivery control can be used to block spam at an edge server, rather than enabling spam to enter an internal enterprise server, for example.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 12:
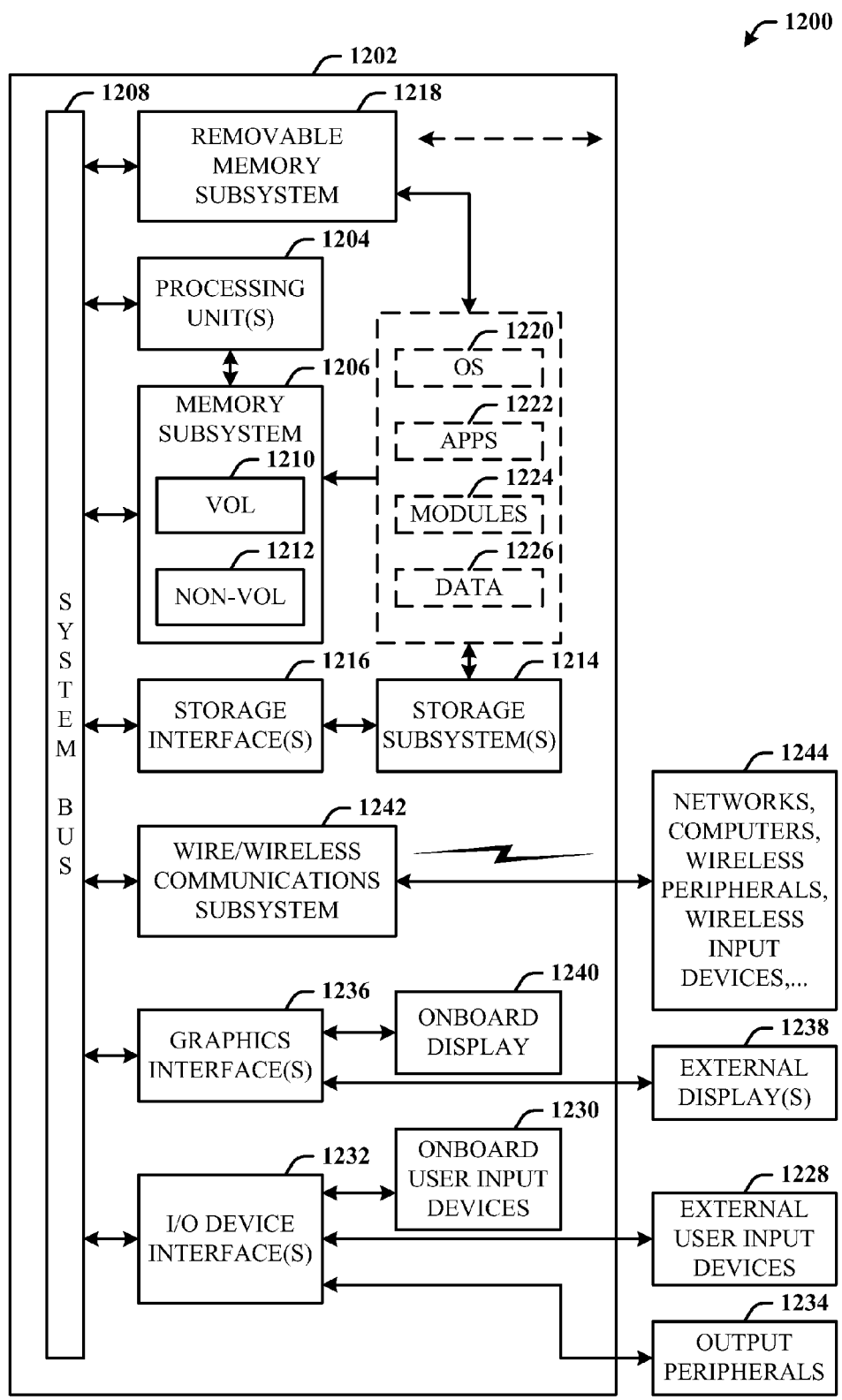
FIG. 12 illustrates a block diagram of a computing system operable to provide management of message delivery based on a social graph in accordance with the disclosed architecture.

Referring now to FIG. 12, there is illustrated a block diagram of a computing system 1200 operable to execute management of message delivery based on a social graph in accordance with the disclosed architecture. In order to provide additional context for various aspects thereof, FIG. 12 and the following discussion are intended to provide a brief, general description of the suitable computing system 1200 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1200 for implementing various aspects includes the computer 1202 having processing unit(s) 1204, a system memory 1206, and a system bus 1208. The processing unit(s) 1204 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1206 can include volatile (VOL) memory 1210 (e.g., random access memory (RAM)) and non-volatile memory (NON-VOL) 1212 (e.g., ROM, EPROM, EEPROM, etc.). A basic input/output system (BIOS) can be stored in the non-volatile memory 1212, and includes the basic routines that facilitate the communication of data and signals between components within the computer 1202, such as during startup. The volatile memory 1210 can also include a high-speed RAM such as static RAM for caching data.

The system bus 1208 provides an interface for system components including, but not limited to, the memory subsystem 1206 to the processing unit(s) 1204. The system bus 1208 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1202 further includes storage subsystem(s) 1214 and storage interface(s) 1216 for interfacing the storage subsystem(s) 1214 to the system bus 1208 and other desired computer components. The storage subsystem(s) 1214 can include one or more of a hard disk drive (HDD), a magnetic floppy disk drive (FDD), and/or optical disk storage drive (e.g., a CD-ROM drive DVD drive), for example. The storage interface(s) 1216 can include interface technologies such as EIDE, ATA, SATA, and IEEE 1394, for example.

One or more programs and data can be stored in the memory subsystem 1206, a removable memory subsystem 1218 (e.g., flash drive form factor technology), and/or the storage subsystem(s) 1214 (e.g., optical, magnetic, solid state), including an operating system 1220, one or more application programs 1222, other program modules 1224, and program data 1226.

Generally, programs include routines, methods, data structures, other software components, etc., that perform particular tasks or implement particular abstract data types. All or portions of the operating system 1220, applications 1222, modules 1224, and/or data 1226 can also be cached in memory such as the volatile memory 1210, for example. It is to be appreciated that the disclosed architecture can be implemented with various commercially available operating systems or combinations of operating systems (e.g., as virtual machines).

The aforementioned application programs 1222, program modules 1224, and program data 1226 can include the computer-implemented system 100 of FIG. 1, which includes the tagging component 102, the users 104, the social relationships 106, the social graph 108, the data component 110, and the data 112, the system 200 of FIG. 2, which includes additional components such as the communications component 202, the messages 204, the types of data transmission such as the block 206, the allow 208 of the messages, delivery of the messages according to priority levels such as high priority 210 and low priority 212, the social relationship categories of the social graph 108 of FIG. 3, including friends 300, family 302, coworkers 304, blocked entities 306, and the metadata 308, the system 400 of FIG. 4, which includes additional components such as the import component 402, the tagged user information 404, and the external sources 406.

The aforementioned application programs 1222, program modules 1224, and program data 1226 can further include the system 500 of FIG. 5, which comprises additional components such as the messaging users 502, the graphing component 504, and the messaging component 506, the system 600 of FIG. 6, which includes additional components such as the delivery component 602, the email messages 604, the global configuration component 606, and the category tags 608, the system 700 of FIG. 7, which includes additional components such as the management component 702, the third party 704, the mining component 706, the email contacts 708, the metadata 710, the perimeter component 712, and the email deployment 714, the social graph 800 of FIG. 8 having categories of social relationships that include family 802, coworkers 804, and friends 806, and also the recipient 808, the social graph 900 of FIG. 9 having social relationship categories such as blocked 902, coworkers 904, family 906, and friends 908, and the methods represented by the flow charts of FIGS. 10-11, for example.

The storage subsystem(s) 1214 and memory subsystems (1206 and 1218) serve as computer readable media for volatile and non-volatile storage of data, data structures, computer-executable instructions, and so forth. Computer readable media can be any available media that can be accessed by the computer 1202 and includes volatile and non-volatile media, removable and non-removable media. For the computer 1202, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1202, programs, and data using external user input devices 1228 such as a keyboard and a mouse. Other external user input devices 1228 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1202, programs, and data using onboard user input devices 1230 such a touchpad, microphone, keyboard, etc., where the computer 1202 is a portable computer, for example. These and other input devices are connected to the processing unit(s) 1204 through input/output (I/O) device interface(s) 1232 via the system bus 1208, but can be connected by other interfaces such as a parallel port, IEEE 1394 serial port, a game port, a USB port, an IR interface, etc. The I/O device interface(s) 1232 also facilitate the use of output peripherals 1234 such as printers, audio devices, camera devices, and so on, such as a sound card and/or onboard audio processing capability.

One or more graphics interface(s) 1236 (also commonly referred to as a graphics processing unit (GPU)) provide graphics and video signals between the computer 1202 and external display(s) 1238 (e.g., LCD, plasma) and/or onboard displays 1240 (e.g., for portable computer). The graphics interface(s) 1236 can also be manufactured as part of the computer system board.

The computer 1202 can operate in a networked environment (e.g., IP) using logical connections via a wired/wireless communications subsystem 1242 to one or more networks and/or other computers. The other computers can include workstations, servers, routers, personal computers, microprocessor-based entertainment appliance, a peer device or other common network node, and typically include many or all of the elements described relative to the computer 1202. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1202 connects to the network via a wired/wireless communication subsystem 1242 (e.g., a network interface adapter, onboard transceiver subsystem, etc.) to communicate with wired/wireless networks, wired/wireless printers, wired/wireless input devices 1244, and so on. The computer 1202 can include a modem or has other means for establishing communications over the network. In a networked environment, programs and data relative to the computer 1202 can be stored in the remote memory/storage device, as is associated with a distributed system. It will be appreciated that the network connections shown are exemplary and other means of establishing a communications link between the computers can be used.

The computer 1202 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 13:
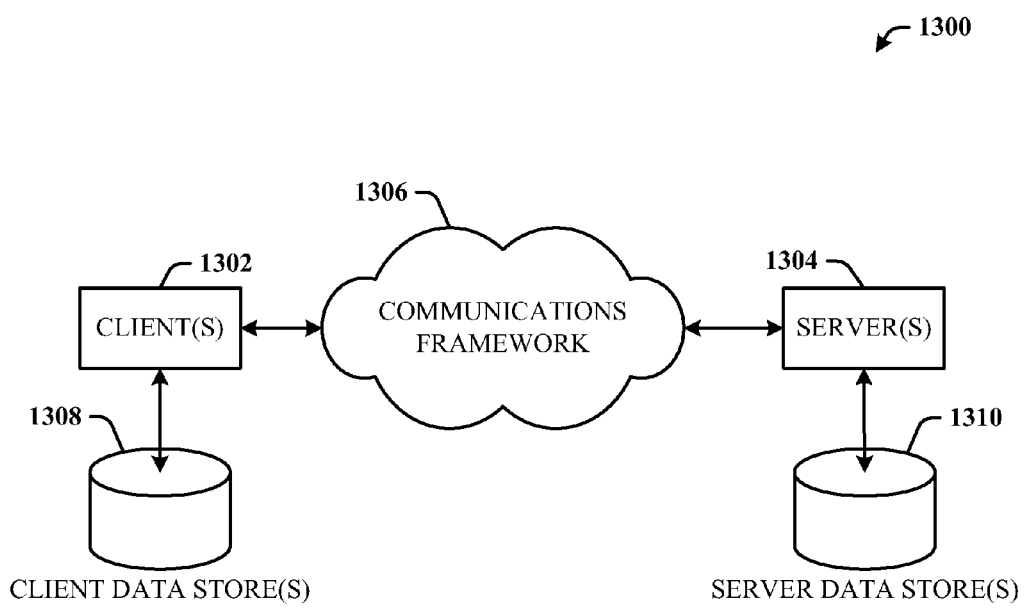
FIG. 13 illustrates an exemplary computing environment operable to provide management of message delivery based on a social graph.

Referring now to FIG. 13, there is illustrated a schematic block diagram of a computing environment 1300 that can be used for management of message delivery based on a social graph. The environment 1300 includes one or more client(s) 1302. The client(s) 1302 can be hardware and/or software (e.g., threads, processes, computing devices). The client(s) 1302 can house cookie(s) and/or associated contextual information, for example.

The environment 1300 also includes one or more server(s) 1304. The server(s) 1304 can also be hardware and/or software (e.g., threads, processes, computing devices). The servers 1304 can house threads to perform transformations by employing the architecture, for example. One possible communication between a client 1302 and a server 1304 can be in the form of a data packet adapted to be transmitted between two or more computer processes. The data packet may include a cookie and/or associated contextual information, for example. The environment 1300 includes a communication framework 1306 (e.g., a global communication network such as the Internet) that can be employed to facilitate communications between the client(s) 1302 and the server(s) 1304.

Communications can be facilitated via a wire (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data delivery system, comprising:
    a tagging component for adding a user to a social graph for a recipient and tagging the added user with a social relationship tag according to a type of social relationship as defined by a category in the social graph, the social graph comprising an entry for each added user, each entry comprising a link to the added user and at least one social relationship tag;
    an import component for importing information related to the tagged user from external sources to augment the social graph, the import component comprising a contact aggregation provider to access the external sources using delegated authentication codes or password authorization;
    a data component for handling data, received from the tagged user, based on the social graph, the data including messages;
    a perimeter component for accessing the social graph from a perimeter and controlling delivery of the messages at the perimeter of an email deployment, the perimeter component to block, at the perimeter, messages from users tagged as blocked in the social graph from passing to internal message servers; and
    a processor implementing one or more of the tagging component, the data component, or the perimeter component.

2. The system of claim 1, further comprising a communications component for transmitting the data to the recipient based on the social graph.

3. The system of claim 2, wherein transmitting the data comprises one of blocking messages, allowing the messages through, or delivering the messages with high or low priority.

4. The system of claim 1, wherein the social graph includes social relationship categories for friends, family, coworkers, and blocked individuals of the recipient.

5. The system of claim 1, wherein the social graph further comprises metadata related to the tagged users, the metadata defines the social relationship to the recipient.

6. The system of claim 1, further comprising a policy component for applying a generic action to multiple tagged users based on the social graph.

7. A computer-implemented data delivery system, comprising:
    a tagging component for tagging messaging users with social relationship tags according to types of social relationships;
    a graphing component for building a social graph for a recipient by adding the tagged messaging users based on categorization of the types of the social relationships of the tagged messaging users, the social graph comprising an entry for each added tagged messaging user, each entry comprising a link to the added tagged messaging user and at least one social relationship tag;

an import component for importing information related to the tagged user from external sources to augment the social graph, the import component comprising a contact aggregation provider to access the external sources using delegated authentication codes or password authorization;

a messaging component for managing delivery of messages to the recipient from the tagged messaging users based on the social graph;

a perimeter component for accessing the social graph at the edge servers and controlling delivery of the messages at edge servers of an email deployment, the perimeter component to use the social graph to determine which messages are allowed for delivery, and to block, at the edge servers, messages from messaging users tagged as blocked in the social graph from passing to internal message servers; and the perimeter component;

a processor implementing one or more of the tagging component, the graphing component, the messaging component, or the perimeter component.

8. The system of claim 7, further comprising a delivery component for delivering email messages to respective email locations based on the social graph.

9. The system of claim 7, further comprising a global configuration component for maintaining a list of social relationship category tags for tagging the messaging users.

10. The system of claim 7, further comprising a management component for enabling a third party to manage the social graph.

11. The system of claim 7, further comprising a mining component for automatically mining email contacts to identify metadata to augment the social graph.

12. A computer-implemented data delivery method, comprising:

tagging message contacts of a recipient with social relationship tags according to types of social relationships;

categorizing and adding the tagged message contacts and the types of the social relationships into a social graph, for the recipient, of social relationship categories; the social graph comprising an entry for each added tagged message contact, each entry comprising a link to the added tagged message contact and at least one social relationship tag;

accessing external sources of information related to the tagged message contacts using delegated authentication codes or password authorization;

importing the information related to the tagged message contacts from the external sources to augment the social graph;

receiving messages from the message contacts;

accessing the social graph;

managing, by a processor, a flow of the messages received from the message contacts by the recipient based on respective social relationship categories of the social graph;

blocking, at a perimeter of an email deployment, messages from unwanted senders from passing into internal message servers; and passing, from the perimeter of the email deployment to the internal message servers for routing, messages from acceptable users in accordance with the social graph.

13. The method of claim 12, further comprising managing flow by at least one of blocking the messages, allowing the messages through, or delivering the messages based on priority.

14. The method of claim 12, further comprising automatically mining the message contacts for metadata to augment the social graph.

15. The method of claim 12, further comprising enabling a third party to manage the social graph.

16. The method of claim 12, further comprising organizing email based on the social graph.

\* \* \* \* \*